Figure 3:
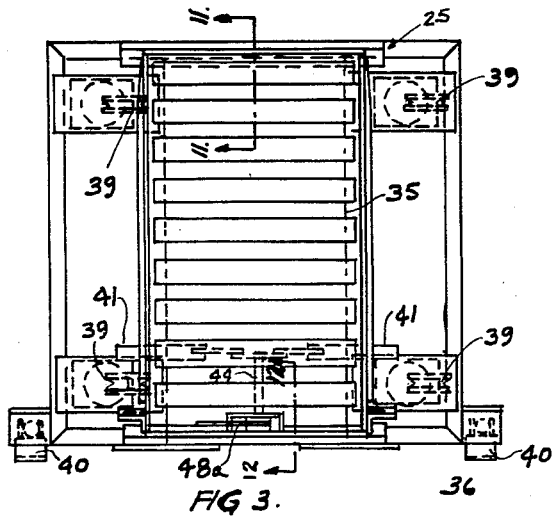

June 7, 1960  LE BARON W. KINNEY  2,939,255
SOLID CARBON DIOXIDE HANDLING APPARATUS AND SYSTEM
Filed Dec. 23, 1955  6 Sheets-Sheet 1
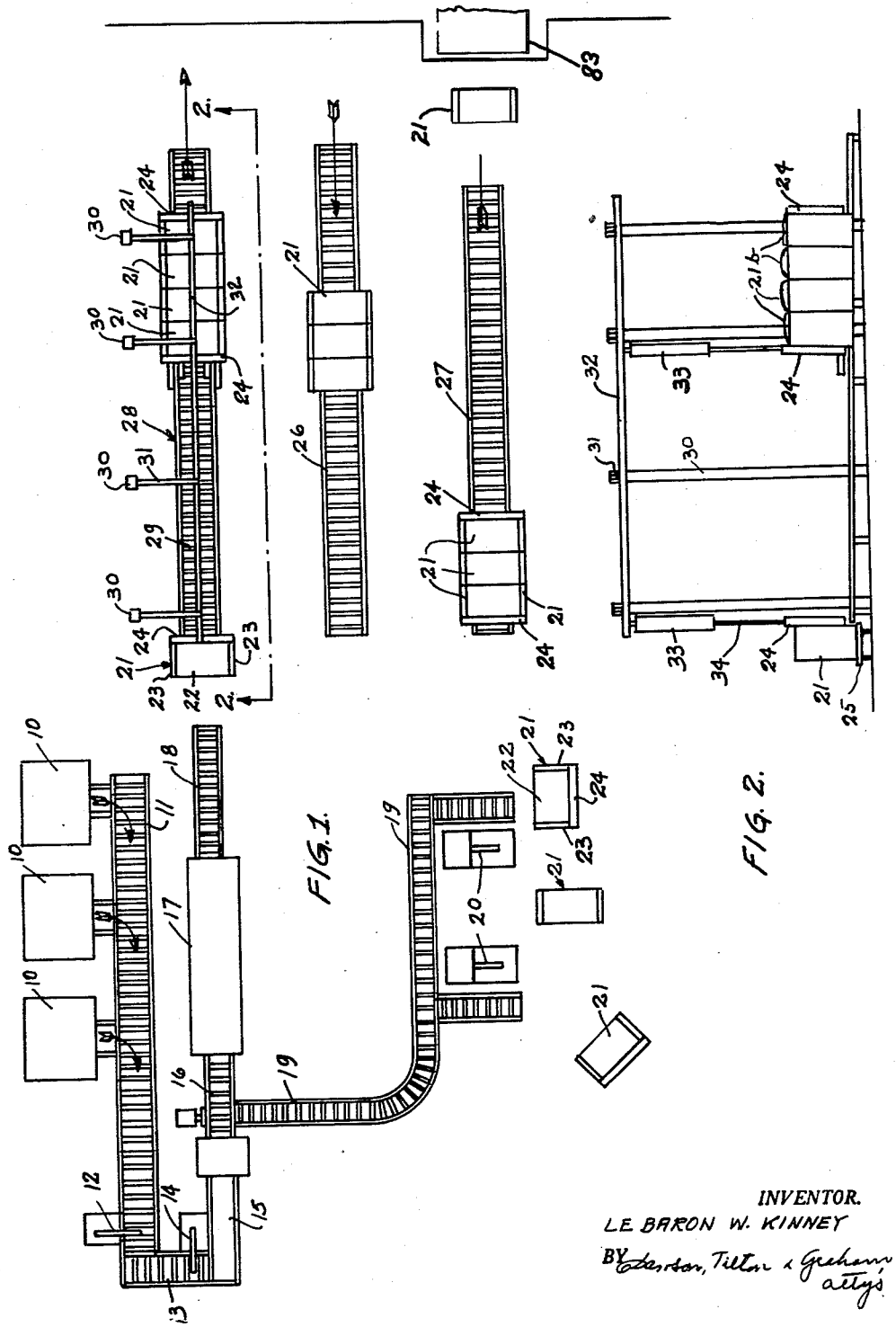
INVENTOR.
LE BARON W. KINNEY June 7, 1960 LE BARON W. KINNEY 2,939,255
SOLID CARBON DIOXIDE HANDLING APPARATUS AND SYSTEM
Filed Dec. 23, 1955 6 Sheets-Sheet 2

INVENTOR.
LE BARON W. KINNEY
BY Lawson Tilton & Graham
Attys

June 7, 1960 LE BARON W. KINNEY 2,939,255
SOLID CARBON DIOXIDE HANDLING APPARATUS AND SYSTEM
Filed Dec. 23, 1955 6 Sheets-Sheet 3

INVENTOR.
LE BARON W. KINNEY
BY Samson, Tilton & Graham
att'ys

June 7, 1960 LE BARON W. KINNEY 2,939,255
SOLID CARBON DIOXIDE HANDLING APPARATUS AND SYSTEM
Filed Dec. 23, 1955 6 Sheets-Sheet 4
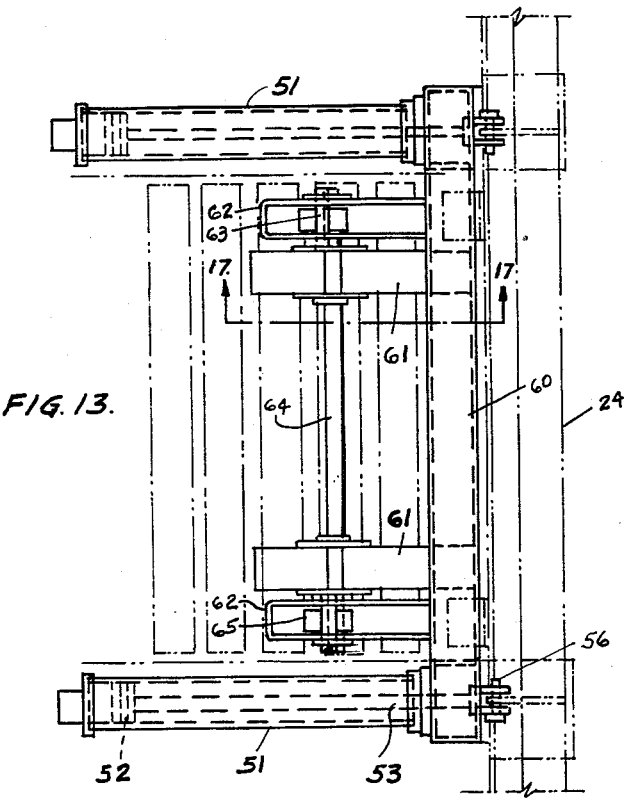
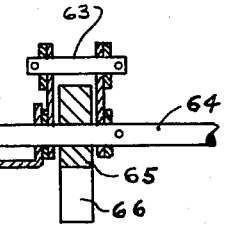
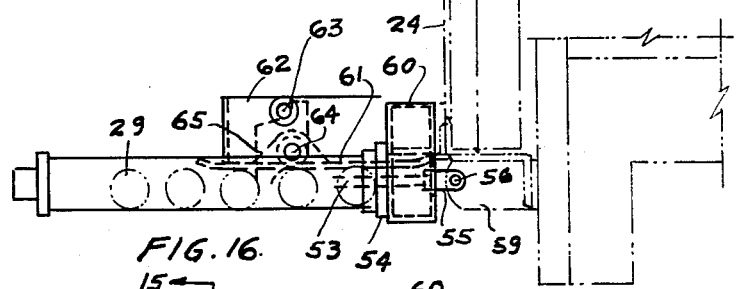
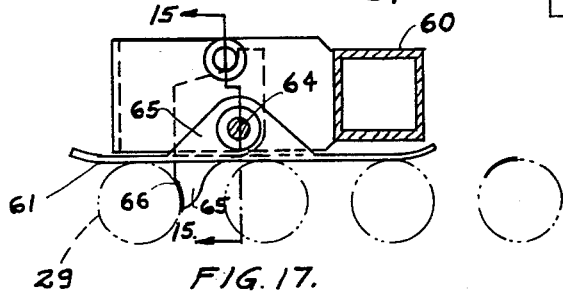
INVENTOR.
LE BARON W. KINNEY

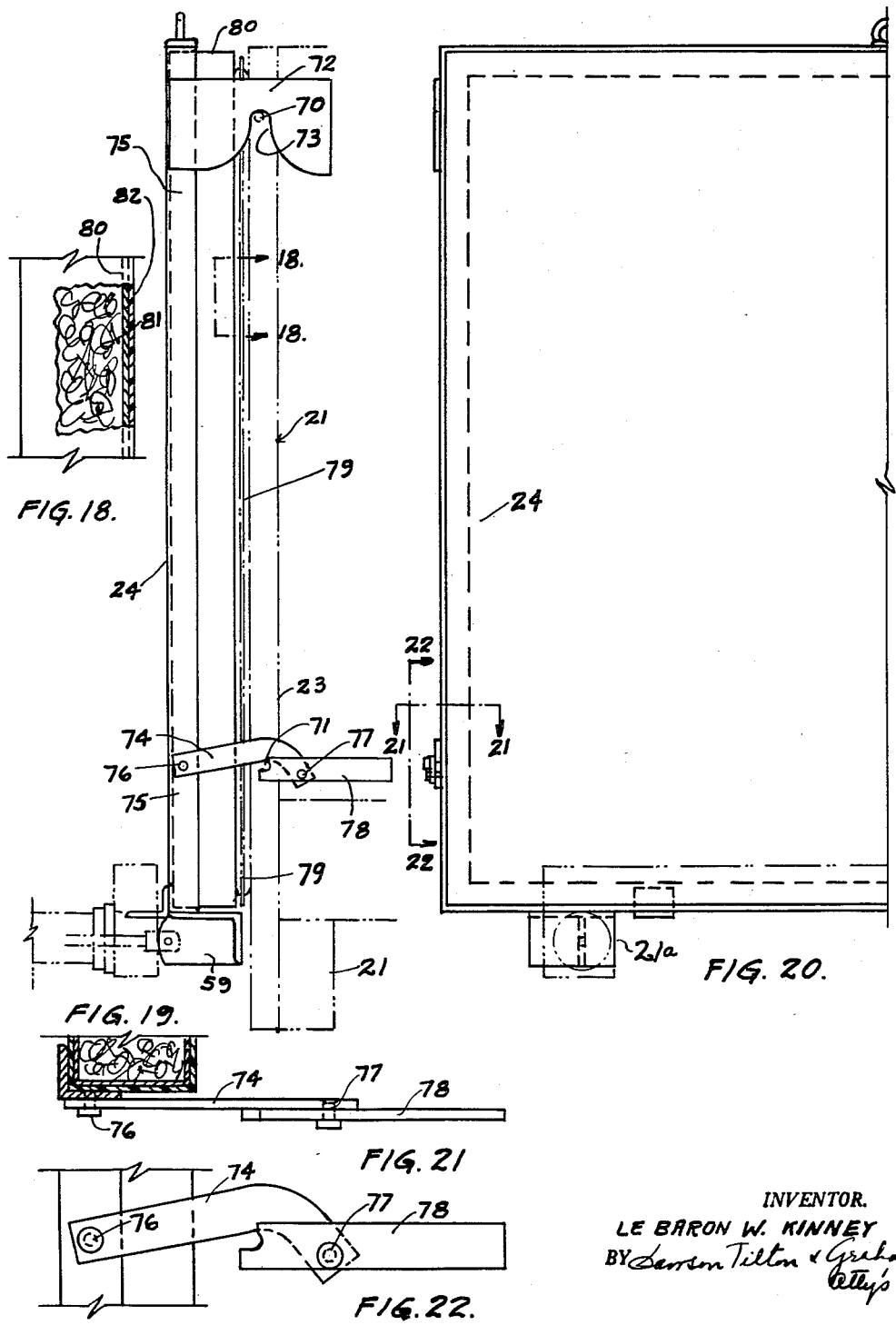

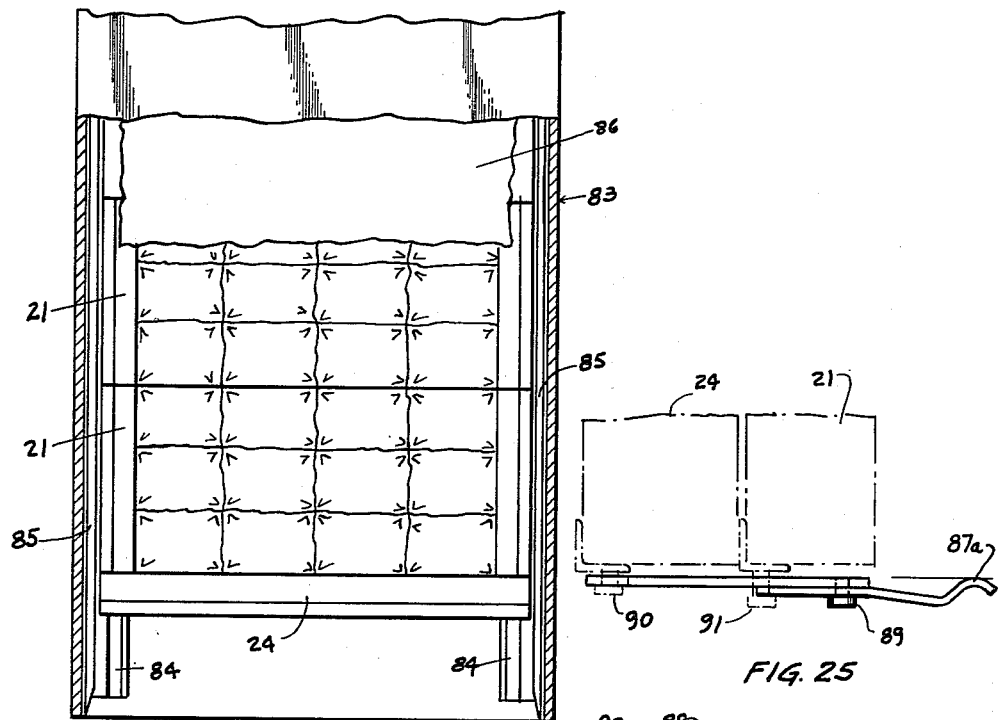
FIG. 23.
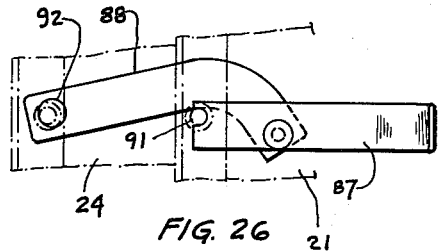
FIG. 25
FIG. 26
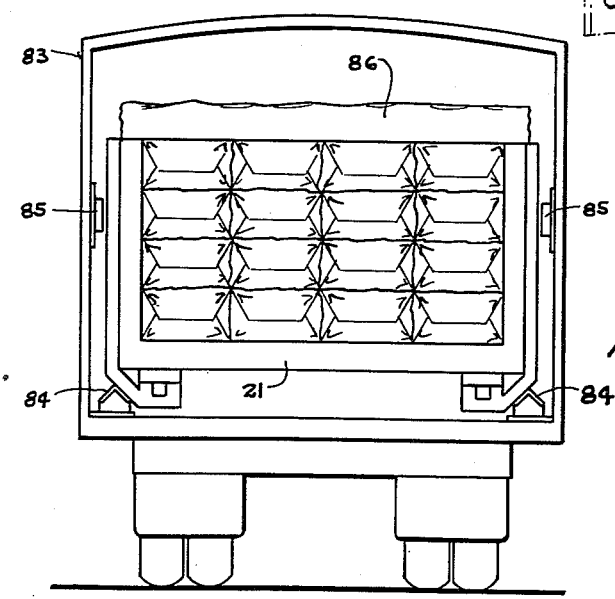
FIG. 24.
INVENTOR.
LE BARON W. KINNEY
BY
Lawson, Tilton & Graham
att'ys ※ # United States Patent Office 2,939,255
Patented June 7, 1960

2,939,255

SOLID CARBON DIOXIDE HANDLING APPARATUS AND SYSTEM

Le Baron W. Kinney, Chicago, Ill., assignor to General Dynamics Corporation, a corporation of Delaware Filed Dec. 23, 1955, Ser. No. 554,961

11 Claims. (Cl. 53—3)

This invention relates to Dry Ice handling apparatus and system. The invention is particularly useful in the storage and shipment of Dry Ice blocks, etc., and in the positioning of the oldest stored ice for the first shipment.

In the handling of Dry Ice as it leaves the compressors, there is a constant loss of the carbon dioxide gas as the ice progresses through the cutting and wrapping stages and finally through the storage and shipping stages. The loss of this valuable product during such periods has long been a problem in the industry. Further, the handling of Dry Ice in pits or open-topped containers has made the handling thereof a difficult and unhealthy one in that the workman is obliged to stand within the pit or container, and in the unloading operation he moves part of the time within a very cold atmosphere and at other times within a warm atmosphere. Because of such conditions, it is further necessary that the storage or transfer containers be relatively shallow in depth, and the economical advantage arising from a deep container could not be realized. A problem has further existed with respect to the storage of the Dry Ice because of the expense involved in providing thick insulating containers about the Dry Ice. Also, in the prior methods of storage, it has been necessary to unload the most recently stored ice prior to the earlier stored ice because the first ice to be stored enters the bottom of the container, while the last ice to be stored rests in the upper part of the container or pit. The disadvantages and discomforts arising from the conditions described above, and the losses of the product which have been sustained, have been regarded as a necessary evil and the problem has remained unsolved.

An object of the present invention is to provide a system or method and apparatus whereby Dry Ice may be handled with a minimum of discomfort and labor effort, and with a minimum of loss of the product due to exposure. A further object is to provide a means and system enabling the Dry Ice to be handled continuously from the compressors and stored within deep containers, the containers being united to form continuous channels in which large bodies of ice may be housed, while effectively sealing the elongated channel against substantial escape of carbon dioxide gases. Yet another object is to provide a simple and effective system whereby containers may be cycled so as to bring empty containers into line with containers being filled to provide a continuous means for handling Dry Ice, and while at the same time providing containers in side-abutting relation to form storage channels for ice.

Yet a still further object is to provide in such apparatus a new form of insulating container structure with removable sides whereby the sides may be removed and replaced in the forming of elongated storage channels. A still further object is to provide in combination with conveyor mechanism means for advancing filled containers for the discharge thereof for shipment, and means for removing and replacing insulated side walls in the handling of containers in column or tandem arrangement. A still further object is to provide in such an apparatus, an improved carriage structure for the effective handling of Dry Ice between conveyors within the storage and shipment system. Other specific objects and advantages will appear as the specification proceeds.

The invention is shown, in a preferred embodiment, by the accompanying drawings, in which—

Figures 4, 5:
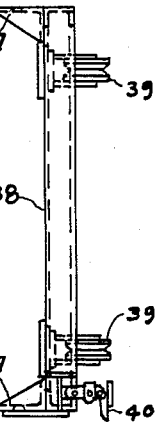
Figure 6:
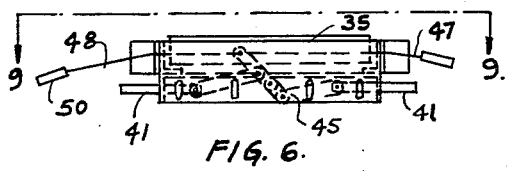
Figure 7:
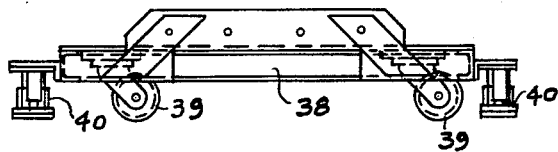
Figure 8:
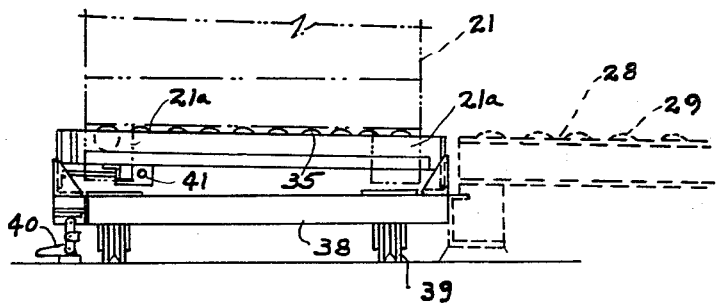
Figure 9:
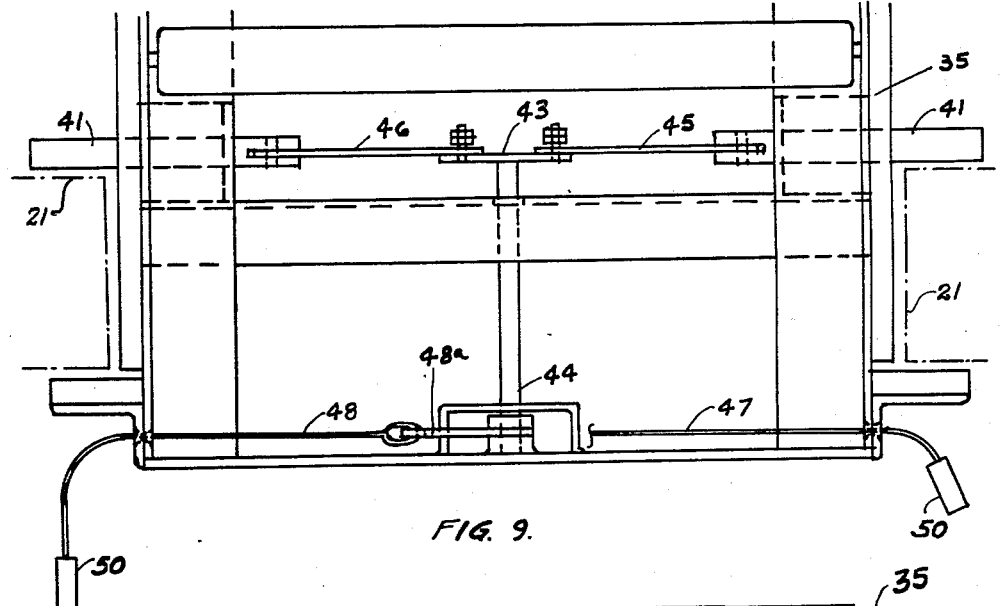
Figure 10:
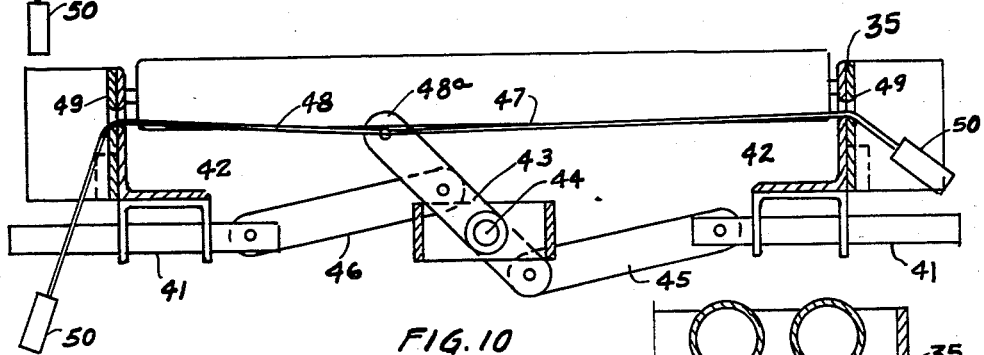
Figure 12:
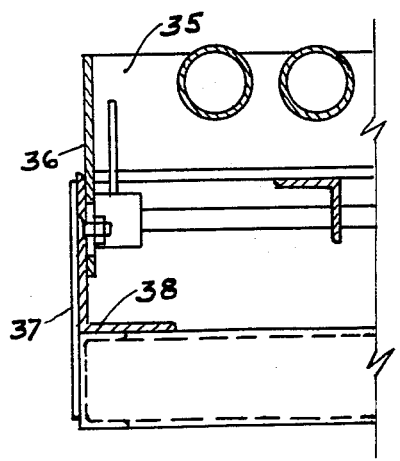
Figure 11:
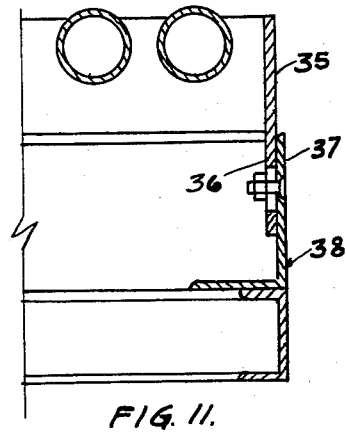

Fig. 1 is a top plan view of ice forming, handling, conveying and storage apparatus embodying my invention; Fig. 2, a side view in elevation, the view being taken as indicated at line 2—2 of Fig. 1; Fig. 3, a top plan view of a container supporting carriage employed in my ice handling system; Fig. 4, a side view in elevation of the upper roller equipped portion of the carriage shown in Fig. 3; Fig. 5, a side view in elevation of the lower portion of the carriage shown in Fig. 3; Fig. 6, a front view in elevation of the carriage latch structure shown in Fig. 3; Fig. 7, a side view in elevation of the carriage unit shown in Fig. 3; Fig. 8, an end view of the carriage unit showing a container thereon in position for discharge upon a container conveyor; Fig. 9, an enlarged view of the latch operating structure or the carriage, the view being taken as indicated at line 9—9 of Fig. 6; Fig. 10, an enlarged sectional detailed view, the section being taken as indicated at line 10—10 of Fig. 4; Fig. 11, an enlarged detailed sectional view, the section being taken as indicated at line 11—11 of Fig. 3; Fig. 12, an enlarged detailed sectional view, the section being taken as indicated at line 12—12 of Fig. 3; Fig. 13, a top plan view of pneumatic mechanism advancing containers upon the container conveyor; Fig. 14, a broken sectional view showing a portion of the roller track and the pneumatic pusher device mounted thereon; Fig. 15, a detailed sectional view on an enlarged scale showing the locking dog carried by the pusher carriage, the section being taken as indicated at line 15—15 of Fig. 17; Fig. 16, a broken side view in elevation of the structure shown in Fig. 13; Fig. 17, a sectional detailed view on an enlarged scale, the section being taken as indicated at line 17—17 of Fig. 13; Fig. 18, a detailed sectional view, the section being taken as indicated at line 18—18 of Fig. 19; Fig. 19, a broken side view in elevation of the ice container and the removable side thereof; Fig. 20, a broken rear view in elevation of the removable side or bulkhead; Fig. 21, a sectional detailed view, the section being taken as indicated at line 21—21 of Fig. 20; Fig. 22 a broken detailed view, the view being taken as indicated at line 22—22 of Fig. 20; Fig. 23, a broken top plan sectional view showing the container loaded within a truck; Fig. 24, a rear elevation of the structure shown in Fig. 23 and showing the loaded container received within the truck with a side of the container removed; Fig. 25, a top plan view of a clamp structure which is employed to secure together two containers; and Fig. 26, a side view in elevation of the structure shown in Fig. 25.

In the illustration given in the drawings and as shown more clearly in Fig. 1, 10 designates three presses which compress Dry Ice to form large blocks. The Dry Ice leaving the presses is passed along the roller conveyor 11 and is sawed by a saw mechanism indicated by the numeral 12. Since such saw mechanism is well know, a detailed description herein is believed unnecessary. The Dry Ice is then passed by a transverse conveyor 13, past a second band saw 14. Ordinarily, the blocks of Dry Ice (20″ x 20″ x 10″) are cut by the first band saw 12 into equal pieces (10″ x 20″ x 10″), and thence after being transferred to the second conveyor 13 are cut by the second band saw into four square cakes (10″ x 10″ x 10″). Of course, the size of the blocks will vary, and the foregoing is simply set out as explanatory of the general operation.

The square cakes or blocks are then passed along the gravity member 15, and thence by conveyor 16 into a wrapping machine 17 in which the cakes are automatically wrapped with paper. From the wrapping machine, the cakes pass along a roller conveyor 18 to a point of discharge where they may be delivered upon containers. When the blocks are to be cut into different sizes and shapes for special packing purposes, such blocks are passed from the conveyor 16 and at right angles thereto along the roller conveyor 19 to a second sawing station where band saws 20 are arranged, and here the blocks may be reduced to small sizes or different sizes for special uses and then stored within the containers 21.

The containers 21 will be described in greater detail hereinafter. Generally, each of the containers comprises an insulated container body somewhat in the shape of the letter U and having an insulated bottom wall and two end walls. The bottom wall is indicated by the numeral 22, and the end walls are indicated by the numeral 23. The structure is so designed as to support a removable side wall which is indicated by the numeral 24. The side wall 24 may be positioned on either or both sides of the container 21 and latched in position thereon.

For supporting the container 21 so as to move it from the delivery end of the roller conveyor 18 or 19 to another station, I provide a carriage member 25, which is shown in considerable detail in Figs. 3 to 12 inclusive. The roller equipped carriage 25 is adapted to receive thereon the container 21 and to convey it to any of the other conveyors which will now be described.

The centrally located roller conveyor 26 is adapted to receive thereon empty containers 21 and is designed to bring the empty containers back to a delivery point at which the containers may be picked up by the carriage 25 and moved to any of the outlet positions for the conveyors 18 and 19.

The side conveyor 27 is provided for receiving containers 21 from the cutting station 20. Here the Dry Ice, which is sawed into special sizes or shapes, is placed upon a container 21, and the containers are moved upon the conveyor 27 for delivery to a truck or other shipping vehicle. In the storing of the filled containers 21, I provide the outermost container with an insulated side 24, and the rear side of the rearmost container 21 similarly with an insulated side 24.

The main conveyor for the Dry Ice blocks is indicated by the numeral 28. This conveyor is provided with rollers 29, and the track is slightly inclined so that the containers tend to move by gravity along the conveyor toward the front end thereof.

A container 21 having a rear side thereof closed by an insulated side 24 and carried by a carriage 25 is filled with wrapped ice blocks from the conveyor 18, and then moved to the position shown in Fig. 1 adjacent the inlet to the inclined conveyor 28. At this point, the rear side 24 is raised, and the container 21 is moved upon the rollers 29. The containers 21 are then moved downwardly along the conveyor 28 to a position near the discharge thereof where the track may be slightly raised to stop their movement, and at this point the several containers are arranged in the position shown in Fig. 1 in which they provide a continuous channel closed at its ends. The foremost container 21 is left with its forward side closed by a side wall 24, while the rearmost container has its rear side closed by a side wall 24. With this structure, the elongated channel containing the Dry Ice is sealed along its ends and sides, and the ice may be thus kept in storage for a long period of time. It will be understood that the individual containers 21 have between their end walls sealing sleeves which form a seal between the separate containers as they come together, and the result is that the long channel containing Dry Ice is effectively sealed from front to rear. A blanket of heavy insulating material is drawn over the top of the containers.

The removable side 24 is raised by hoist 33 from the line of stored containers before a new recently-filled container is rolled down the track to be added to the stored containers.

As the channel formed by a number of containers 21 is lengthened, it is necessary to remove side walls from one side of the container and to insert a side wall at the other side of the container to effect the sealing at the end of the channel. The lifting and placing of the insulated side walls may be effected by any suitable mechanism. In the specific illustration given, I provide supporting posts 30 on one side of the conveyor 28, and the posts carry transverse supporting frames 31 on which is mounted a rail 32. Depending from rollers carried by the rail 32 are compressed air piston-equipped cylinders 33 equipped with operating rods 34 which may be attached to the container side walls 24 for raising and lowering the same. As shown best in Fig. 2, the side walls of the various containers may, after detachment from the container, be raised and placed on the opposite side of the container and then sealed thereto.

Any suitable carriage may be employed for the transfer of the containers. I have found that the structure shown in Figs. 3 to 12, inclusive, has special advantages in that the carriage permits the containers to be rolled thereon and to be readily discharged therefrom, while at the same time the degree of tilt of the roller carried by the conveyor may be modified. The structure is further highly useful in that it provides equally releasable locking means for holding the container in position thereon and means for anchoring the carriage to the floor when this is desired.

The carriage 25 comprises an upper roller-equipped member 35 having depending end flanges 36 receivable within the end flanges 37 of the lower tractor portion 38. The lower portion 38 is equipped with grooved wheels 39 which are adapted to move on tracks provided along the wall or floor of the factory, and carried by the lower frame 38 are floor locking devices 40 which are a well known construction. Since such devices are well known, a further detailed description herein is believed unnecessary. Any suitable means for locking the container 21 upon the carriage roller conveyor 35 may be employed. In the illustration given, I provide a pair of locking bars 41 which are guided within the frame members 42, as shown best in Fig. 9. The locking bars 41 then extended laterally engage the depending pallet feet 21a of the container 21. To hold the container in position, as illustrated best in Fig. 8, and to manipulate the locking pins 41, I provide a central link member 43 fixed upon the pivot rod 44, the lower end of the link 43 being connected by pivot to the link 45 to one of the links 41, while another link 46 connects the upper end portion of the member 43 to the other bolt or rod 41. The upper end of the lever member 43a, fixed to the rod 44, is apertured to receive the flexible elements 47 and 48 which extend laterally through openings in the side walls 49, and are equipped at their ends with handle weights 50. By drawing the filament 48, the locking bars 41 are moved to their outer position. By drawing the other member 47, the locking bars are retracted.

By having the roller member 35 at an angle, as illustrated in Fig. 8, the container will be held upon the carriage in such a manner that it can be readily moved onto another conveyor such as 28, as illustrated in Fig. 8.

It is important to provide on the conveyor 28, means for effectively discharging the containers 21 as desired so that the containers may be placed upon lift trucks or roller trucks or any other suitable means for moving the containers to shipping trucks or other vehicles. To this end, I provide a pneumatic or compressed-air pusher device, as shown best in Figs. 13 to 17, inclusive, the pusher device being equipped with means for anchoring itself upon the rollers so that a container may be pushed forwardly, while at the same time the pusher device is rendered effective for moving itself rearwardly upon the roller conveyor.

In the illustration given in Figs. 13 to 17, inclusive, I provide a pair of compressed air cylinders 51, each containing a piston 52 equipped with a forwardly extending stem or rod 53. The rod extends through the forward end 54 of the cylinder and has a bifurcated forward flange 55 apertured to receive a bolt 56. A flange 59 is carried on each side of the rear side wall or bulkhead 24 of a container 21, and the flange is apertured to receive the bolt 58. The bolt 58 thus releasably connects the rear side wall 24 of a container 21 with the piston rod 53. The forward end of each of the cylinders 51 is secured to a cross frame member 60, and the cross frame mmeber is provided with a pair of platform members 61 adapted to rest upon the rollers 29, as shown best in Fig. 16. The vertical frame members 62 are supported laterally of the platforms 61 and upon beam member 60 and support the upper shaft 63 and a lower pivot shaft 64. Upon pivot shaft 64 are mounted the locking dogs 65 having lower arcuate edges 66 engageable with a roller 29, as shown best in Fig. 17.

In the operation of the pusher member described, compressed air is fed to the rear end of the piston 52, and since the frame structure 60 is held through its connection with the dogs 65 against rearward movement, the piston rod 53 is effective in moving the side wall 24, and the container 21 which it is connected, forwardly. When compressed air is fed then to the opposite side of the piston 52 which has moved toward the cylffiinder head 54, since the piston is held by the container 21, the expansion of the compressed fluid within the cylinder causes each cylinder to move forwardly, and thus to obtain a new position for advancing the containers. In the latter movement, the dog 65 rides over the rollers 29 and then seats against a roller for latching the pusher device for advancing the container another step ahead, the operation being as above described.

The container 21 and the side wall 24 thereof are shown in greater detail in Figs. 18 to 21, inclusive. Each of the containers 21 is provided with depending pallet leg or foot 21a so that the container is thus supported above the floor and may be readily handled by the fingers of lift trucks or other moving devices. For anchoring the insulated side wall 24 to each of the sides of the container 21, I provide the ends walls 23 with pins 70 and 71. The insulated side 24 is equipped at its top with a latch flange 72 having a notch 73 therein adapted to engage the pin 70. At the bottom, the side 24 is provided with a latch bar 74 pivotally secured to the frame 75 of the side walls 24 by the pivot 76, and the latch bar has a downwardly curved outer portion connected by a pivot pin 77 to a latch 78 having an inner notched end engaging the pin 71.

It is important that the ends of the containers 21 be sealed when the ends are brought together, as illustrated in Fig. 1, and also when the side walls 24 are secured against the end walls. To accomplish this, I provide long insulation sleeves 79 filled with insulating material and which are secured to the ends and to the bottom panel of the containers 21 by cement. The sealing sleeve 79 is preferably formed of a sturdy fabric material forming an elongated container, and filled with glass wool or rock wool or other suitable insulating material. The sleeve is generally U-shaped, extending on one side along the inner edge of an end wall and then downwardly along the bottom wall of the container 21, and thence upwardly along the opposite end wall. This U-shaped sealing sleeve thus forms not only an insulating barrier against the escape of carbon dioxide gas when the side wall 24 is anchored against the end walls, as ilustrated in Fig. 19, but also is effective in forming a tight seal between the containers 21, free of their end walls, as illustrated in Fig. 1.

The insulation for the end walls and side walls of container 21 may be supported in any suitable manner. I prefer to provide a metal frame in which is placed a box filled with insulation and enclosed within a plastic envelope. As shown more clearly in Figs. 18 and 19, a paper carton 80 filled with insulation 81 is enclosed within a moisture-proof and sturdy plastic container 82, and the container 80 is anchored within the metal frame 75.

*Operation*

In the operation of the method and apparatus, Dry Ice is formed in the usual manner within compressors 10, and the same is passed along roller conveyor 11 to sever the blocks by the band saw 12. The severed blocks are carried by the conveyor 13 which extends at a 90° angle with respect to conveyor 11, and the blocks are again severed by the band saw 14. From thence, the blocks travel either by way of the conveyor 18 or the conveyor 19 to the separate stations. The blocks passing through the automatic wrapping machine 17 are passed on by the conveyor 18 and stacked within the container 21 carried by a carriage 25.

The container 21 is locked upon the inclined platform 35 of the carriage 25 by the latching bolts 41 in engagement with the container feet 21a. The container 21 is preferably equipped on one side with a removable insulated side 24 leaving the other side open. Through the open side, the container 21, resting upon the carriage 25, is filled either at the station adjacent the saws 20 or at the outlet of the roller conveyor 18. In the filling operation, the operator takes the wrapped ice in the form of cakes and places these upon the container floor 22, the side wall 24 serving as a backing for the cakes or blocks as they are packed. The carriage is then pushed on tracks (not shown) into alignment with the outgoing roller conveyors 27 or 28. In the illustration given, the container is supported adjacent the inner end of the roller conveyor 28. In this position, the locking bolts 41 are released by drawing the latching member 47 outwardly, and the container 21 may then be rolled freely onto the outgoing roller conveyor 28, as illustrated best in Fig. 8. The container 21 moves by gravity downwardly along the roller conveyor 28 until it engages another of a series of containers 21, as illustrated in Fig. 1. At this point, the pneumatic cylinders 33 are employed for hoisting the inner side 24 of the container 21 so as to bring the open inner side of the container 21 into contact with the open outer side of the next container 21. The lifted side 24 then may be lowered into position against the outer side of the container so that the channel formed by the several containers is closed at both ends. As illustrated in Fig. 1 and in connection with the conveyor 28, the foremost container 21 is allowed to retain its forward side wall 24, while the succeeding or intermediate containers 21 are entirely without side walls. The rearmost container 21 has a side wall 24 at its rear or outer side. It will be understood that there may be any number of containers 21 and that they together form a channel in which the Dry Ice is housed, the ends of the channel being closed by the endmost sides 24, as illustrated. After the channel has been formed, I prefer to close the top of the channel by means of an insulating blanket 21b, as illustrated in Fig. 2. It will be understood that any suitable insulating cover or blanket may be employed for this purpose.

It is of extreme importance that the containers 21 have an effective seal between them when they are arranged in the side-abutting relation forming the elongated channel. The U-shaped insulation sleeve 79 which extends along the ends of the end walls and along the bottom wall and then upwardly against the other end wall forms a compressible seal which, when the containers move one by one into side-abutting relation forms an effective seal against the loss of carbon dioxide and the shrinkage of the product. Similarly, the U-shaped insulation sleeve 79 is effective in sealing each of the side walls 24 against the adjacent end walls and bottom wall to form a seal for that side of the container.

When it is desired to move one or more of the containers 21 forwardly and discharge it from the conveyor 28, the pusher device is set into operation and the series of containers are advanced to bring the foremost container which, incidentally, represents the oldest ice, to discharge it from the conveyor. At this point, an additional side 24 may be placed upon the discharged container and the same may be carried by a lift truck or other form of motor truck to a vehicle which is to carry the containers to their final destination.

In storing the containers within a truck or other shipping vehicle, the containers 21 are conveyed into the vehicle and stored therein in the same manner as that illustrated in Fig. 1 in connection with conveyor 28, the innermost container 21 having its forward end closed by a side wall 24, and the rearmost container 21 having its rear closed with the side wall 24, the intervening containers 21 having no side walls at all. In other words, the channel formed by a plurality of containers in side-abutting relation is effectively set up in the shipping vehicle itself just as it was set up on the storage conveyor 28.

In the operation of the pusher mechanism, compressed air or other pressure fluid is fed to each of the cylinders 51 at a point to the rear of the piston 52 and, since the cylinders are held in position and against rearward movement because of their connection with the frame members 60 and 62 and the dogs 65 resting against rollers 29, the piston rods 53 move forwardly and cause the containers 21 to be advanced for substantially the length of the pistons, the pressure fluid is then admitted to the other side of the piston 52, and this operation causes the cylinders 51 to follow up the movement of the rods and for such follow-up movement, the dogs 65 slide freely over the rollers 29.

At their destination, the containers 21 may be removed from the shipping vehicle and opened to discharge ice therefrom, or the containers 21 with their side closures 24 may be left with the user so as to provide further effective storage means and to prevent shrinkage of the product. Empty containers 21 may be brought back by the shipping truck or other vehicle and returned along the roller conveyor 26 to a central position for reuse, as illustrated in Fig. 1.

A shipping truck is illustrated in Fig. 1 and Figs. 23 and 24, and the manner of transferring the containers 21 thereto. For example, the container 21 is allowed to travel on track 28 downwardly and onto a roller-equipped transfer dolly or other device, or may be delivered on tracks directly to the waiting truck 83. The truck 83, as illustrated best in Figs. 23 and 24, is equipped at its bottom with pointed rails 84 which engage the lower inclined frame members of the container 21 so as to firmly support the container within the truck. The container 21 is moved to the forward end of the truck, leaving the forward side closure 24 closing the forward side of the container, the rear side of the container being left open. Additional containers 21 may then be introduced into the truck and the side walls 24 of the intermediate containers 21 may be omitted on both sides thereof. When the final container 21 is introduced into the rear end of the truck, it is found that the containers are sealed throughout except for the rear side of the rearmost container, and to close this side, closure 24 is introduced into position, as illustrated in Fig. 23. Thus, a series of containers 21 are secured within the truck in sealed condition and while employing only two closures 24, one closure 24 being employed at the forward side of the foremost container and the other closure 24 being employed at the rear side of the rearmost container. The inclined rails 84 within the truck aid in keeping the containers in tightly sealed condition with their edges abutting throughout to form the seal.

The truck 83 is preferably provided with side guide members 85 which extend above the tracks 84, as illustrated in Figs. 23 and 24. Above the cakes of Dry Ice may be placed an insulated side or cover 86, as also shown in Figs. 23 and 24.

The preferred sequence of operations may be set out as follows: Referring more particularly to Fig. 1 of the drawing, container 21 is first filled as it stands on transfer carriage 25, with the side 24 in position as illustrated. The side 24 is then raised by hoist 35 from this container and the container is advanced toward the series of containers 21 on track 28, the removable side 24 of the rearmost container in the series being raised by the hoist 33 so as to be out of the way of the newly-filled container moving down the roller conveyor 28. As the new conveyor meets the series of stored containers 21, the side 24 is moved backwardly along the track 32 into a position for lowering to the closing side on the rear of the rearmost container in the series of containers 21. After the side 24 has been lowered into position, air is reapplied to the pusher cylinders 51 to force the stored containers tightly together, thus forming a tight seal between the adjacent containers all the way from the front to the rear of the series, while at the same time the front side of the series and the rear side of the series is closed by a side 24. If desired, the air may be left on so as to maintain a continuous pressure on the seals between the individual containers. If it is desired not to leave the air pressure continuously applied to the pusher, it is, of course, possible to clamp each container to the next one, employing a suitable clamp.

In Figs. 25 and 26, I show a clamping device which is effective in connecting two adjacent containers. For example, the lower pins 90 and 91 of two adjacent containers (corresponding to the lower pin 71 described in connection with Fig. 18) may be connected by a clamp 87 having at its forward side an inwardly indented portion 87a. The clamp 87 is connected to lever 88 by a pivot pin 89 which is recessed at its rear to engage the latch pin 91. To facilitate engagement with the rearmost pin 90, the lever 88 is enlarged at 92 so as to permit its engaging the pin 90. With the structure shown, two adjacent containers 21 can be readily drawn together and the sealing pads between the containers compressed to form a tight seal between the containers under the force of the clamping engagement described. With this structure, the continuous application of air pressure on the seals can be omitted. From the foregoing description, it will be observed that the handling and storage of the Dry Ice within the plant is integrated with the transportation of the Dry Ice from the plant, whether the removal of the Dry Ice from the plant be carried on by truck, freight cars, or by any other suitable vehicle transportation. The product Dry Ice, which is difficult to handle and store and which diminishes upon standing by exposure, is thus handled in large quantities with a minimum of labor requirements while at the same time delivering ice continually from the filling side of the system to the outlet side and into the trucks, cars, or other shipping vehicles. In each of these procedures, the containers 21 form an effective seal between their abutting edges when arranged in series, either on the tracks awaiting shipment or in the trucks or other vehicles themselves, while at the same time the foremost side of the foremost container and the rear side of the rearmost container are equipped with a closure for sealing the same. In the discharging of Dry Ice from the containers, the foregoing arrangement permits ready removal, the side walls 24 being removed only from the front and rear sides when the entire shipment is discharged and used; or, should only a portion of the load be used and the remaining portion stored, the portion being stored may be effectively sealed during the storage period by pressing the containers against each other in line and applying the closure sides 24 to the front and rear sides of the series of containers, that is to say, at the foremost side of the foremost container and rear side of the rearmost container.

With the foregoing process and apparatus, it is found that large amounts of Dry Ice can be effectively handled by fewer persons and without exposing anyone to unhealthful conditions, while at the same time larger containers may be employed and the ice handled with less shrinkage than has been experienced heretofore.

While, in the foregoing specification, I have set forth a specific structure and procedure in considerable detail for the purpose of illustrating the invention, it will be understood that such details of structure and process may be varied widely by those skilled in the art without departing from the spirit of my invention.

I claim:

1. In a method for transporting and storing Dry Ice in which the Dry Ice is formed into blocks and stacked within open sided containers, equipped with upstanding end walls the steps of pressing the containers into side-abutting relation to form a channel, sealing the abutting container sides, and closing the outer-most sides of the outermost containers to close said channel.

2. In a method for transporting and storing Dry Ice in which the Dry Ice is stacked within open sided containers equipped with upstanding end walls, the steps of interposing a compressible insulating and sealing material between the containers, and pressing the containers together to seal the spaces therebetween and to form a channel, and closing the outermost sides of the outermost containers to close said channel.

3. The process of claim 2 in which the pressing of the containers together is effected by rolling the containers against each other by gravity.

4. In a method for transporting and storing Dry Ice, the steps of partially filling a container having closed ends, an open side and a closed side provided with a removable side wall, moving the container toward another filled container, removing the removable side wall from the inner side of the latter container, and securing the same to the outer side of the first container.

5. In a process for transporting and storing Dry Ice in which the Dry Ice is stacked within open sided containers equipped with upstanding end walls, the steps of interposing compressible insulating and sealing material between the containers, pressing the containers together to effect a sealing therebetween, and applying an insulated side wall to the rear side of the rearmost container and pressing the same into sealing relation with the rearmost container wall.

6. The process of claim 5, in which a sealing closure is drawn over the Dry Ice within said containers.

7. In a Dry Ice handling system, the steps of severing Dry Ice into blocks, wrapping the blocks of ice, stacking the wrapped blocks of ice into open-sided U-shaped containers, closing the foremost side of the foremost container, moving side walls from the front side to the rear side of each of the containers as it is added to the foremost container, and finally moving a side wall into closing position with respect to the rearmost side of the rearmost container.

8. The process of claim 7, in which the line of containers in side-abutting relation is advanced to free the foremost container and in which a side wall is secured to the foremost wall of the foremost container remaining after the freeing of said first-mentioned container to seal the same.

9. In combination, a plurality of U-shaped containers having open sides and removable side walls therefor, a conveyor for receiving said containers in side-abutting relation, and hoisting means associated with said conveyor for applying sides to containers and for moving a side from one side of a container to the other.

10. The structure of claim 9 in which pressure fluid is employed with piston-equipped cylinders for the raising and the lowering of said side walls, said cylinders being carried by a track extending longitudinally of said conveyor.

11. In a method for storing Dry Ice, the steps of providing a generally rectangular container having an open top and one vertically extending open side, stacking wrapped Dry Ice in said container through said open side, applying a removable side wall to said open side to close and seal the same, and drawing an insulated body over the top of the Dry Ice.

References Cited in the file of this patent

UNITED STATES PATENTS

| | | |
|---|---|---|
| 990,161 | Paiste | Apr. 18, 1911 |
| 1,563,863 | Joyner | Dec. 1, 1925 |
| 1,590,995 | Nelson | June 29, 1926 |
| 1,673,014 | Morrison | June 12, 1928 |
| 1,951,131 | Contos et al. | Mar. 13, 1934 |
| 1,975,936 | Goodwin | Oct. 9, 1934 |
| 2,246,016 | Sinclair | June 17, 1941 |
| 2,256,215 | Orth | Sept. 16, 1941 |
| 2,380,913 | Bennett | Aug. 7, 1945 |
| 2,384,494 | Schutter | Sept. 11, 1945 |
| 2,501,980 | Wolfe | Mar. 28, 1950 |
| 2,521,803 | Reed | Sept. 12, 1950 |